(12) United States Patent
Tsutsumi et al.

(10) Patent No.: US 10,635,079 B2
(45) Date of Patent: Apr. 28, 2020

(54) MOTOR CONTROL DEVICE, CONTROL SYSTEM, AND MOTOR CONTROL METHOD

(71) Applicant: FANUC CORPORATION, Yamanashi (JP)

(72) Inventors: Tomohisa Tsutsumi, Yamanashi-ken (JP); Yuuki Morita, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 16/180,342

(22) Filed: Nov. 5, 2018

(65) Prior Publication Data

US 2019/0137967 A1    May 9, 2019

(30) Foreign Application Priority Data

Nov. 7, 2017    (JP) .................... 2017-214608

(51) Int. Cl.
*G05B 19/406* (2006.01)

(52) U.S. Cl.
CPC .. *G05B 19/406* (2013.01); *G05B 2219/42267* (2013.01)

(58) Field of Classification Search
CPC .................................................. G05B 19/406
See application file for complete search history.

(56) References Cited

U.S. PATENT DOCUMENTS

2016/0297043 A1    10/2016    Inaguchi

FOREIGN PATENT DOCUMENTS

| JP | 2006259823 A | 9/2006 |
|---|---|---|
| JP | 201362928 A | 4/2013 |
| JP | 2016200523 A | 12/2016 |
| WO | 2014013550 A1 | 1/2014 |

OTHER PUBLICATIONS

English Abstract for Japanese Publication No. 2016-200523 A, published Dec. 1, 2016, 2 pgs.
English Abstract for International Application No. 2014013550 A1, published Jan. 23, 2014, 2 pgs, including English Machine Translation of Japanese Republication No. JPWO2014013550 A1, published Jun. 23, 2016, 13 pgs.
English Abstract and Machine Translation for Japanese Publication No. 2013-062928 A, published Apr. 4, 2013, 6 pgs.
English Abstract and Machine Translation for Japanese Publication No. 2006-259823 A, published Sep. 28, 2006, 7 pgs.

(Continued)

*Primary Examiner* — Tejal Gami
(74) *Attorney, Agent, or Firm* — Fredrikson & Byron, P.A.

(57) ABSTRACT

A motor control device is equipped with a command receiving unit adapted to receive movement commands and first control periods of the movement commands from each of a plurality of numerical controllers, a command generating unit which, on the basis of the plurality of first control periods and a plurality of second control periods in accordance with each of the plurality of first control periods, is adapted to generate movement commands of the plurality of second control periods from the movement commands of the plurality of first control periods, and a motor control unit adapted to control a motor in accordance with the plurality of movement commands generated by the command generating unit.

14 Claims, 5 Drawing Sheets

(56) References Cited

OTHER PUBLICATIONS

Untranslated Decision to Grant a Patent mailed by Japan Patent Office (JPO) for Application No. 2017-214608, dated Nov. 5, 2019, 3 pgs.
English Machine Translation of Decision to Grant a Patent mailed by Japan Patent Office (JPO) for Application No. 2017-214608, dated Nov. 5, 2019, 2 pgs.
Untranslated Notice of Reasons for Refusal mailed by Japan Patent Office (JPO) for Application No. 2017-214608, dated Sep. 3, 2019, 4 pgs.
English Machine Translation of Notice of Reasons for Refusal mailed by Japan Patent Office (JPO) for Application No. 2017-214608, dated Sep. 3, 2019, 4 pgs.
English Abstract for International Publication No. 2014013550 A1, published Jan. 23, 2014, 2 pgs, including English Machine Translation of Japanese Republication No. JPWO2014013550 A1, published Jun. 23, 2016, 13 pgs.

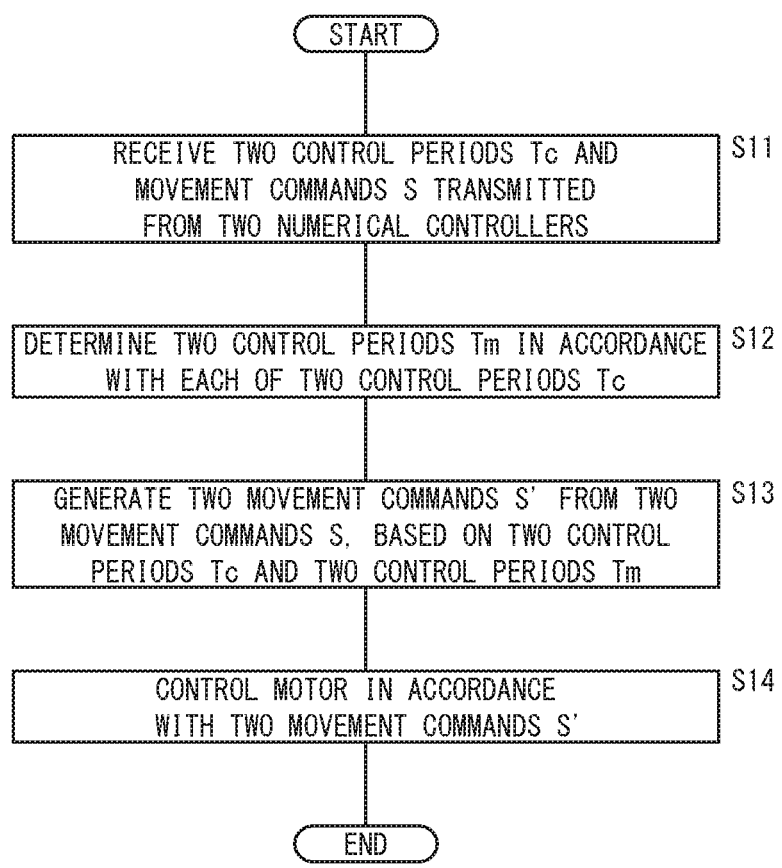

MOTOR CONTROL DEVICE, CONTROL SYSTEM, AND MOTOR CONTROL METHOD

CROSS-REFERENCE TO RELATED APPLICATION

This application is based upon and claims the benefit of priority from Japanese Patent Application No. 2017-214608 filed on Nov. 7, 2017, the contents of which are incorporated herein by reference.

BACKGROUND OF THE INVENTION

Field of the Invention

The present invention relates to a motor control device, a control system, and a motor control method, which serve to control a motor.

Description of the Related Art

As described in Japanese Laid-Open Patent Publication No. 2016-200523, a motor control device controls a motor on the basis of commands from a numerical controller.

SUMMARY OF THE INVENTION

However, when a control period of the numerical controller differs from the control period of the motor control device, a problem occurs in that an excess or a deficiency occurs in the number of data required for the control, and the control of the motor is delayed. As a result, fluctuations in speed and positional deviations occur, and the stability of the motor control deteriorates. In particular, this is all the more true in the case that a plurality of numerical controllers control the motor via a single motor control device.

Thus, an object of the present invention is to provide a motor control device, a control system, and a motor control method, which act to prevent a decrease in stability of the motor control, even in the case that the control period of a numerical controller differs from the control period of the motor control device.

According to a first aspect of the present invention, a motor control device is provided, comprising a command receiving unit adapted to receive a movement command and a first control period of the movement command from each of a plurality of numerical controllers, a command generating unit which, on the basis of the plurality of first control periods and a plurality of second control periods in accordance with each of the plurality of first control periods, is adapted to generate movement commands of the plurality of second control periods from the movement commands of the plurality of first control periods, and a motor control unit adapted to control a motor in accordance with the plurality of movement commands generated by the command generating unit.

According to a second aspect of the present invention, a control system is provided, comprising the motor control device and the plurality of numerical controllers according to the aforementioned first aspect of the present invention, wherein each of the plurality of numerical controllers comprises a period setting unit adapted to set the first control periods, and the period setting units set the first control periods in accordance with a processing load ratio by the numerical controllers.

According to a third aspect of the present invention, a motor control method for controlling a motor is provided, comprising a command receiving step of a motor control device receiving a movement command and a first control period of the movement command from each of a plurality of numerical controllers, a command generating step of the motor control device generating, on the basis of the plurality of first control periods and a plurality of second control periods in accordance with each of the plurality of first control periods, movement commands of the plurality of second control periods from the movement commands of the plurality of first control periods, and a motor controlling step of the motor control device controlling the motor in accordance with the plurality of movement commands generated by the command generating step.

According to the present invention, it is possible to prevent a decrease in stability of the motor control, together with reducing the load on the motor control device, even in the case that the control periods differ between the plurality of numerical controllers and the motor control device.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 5 is a flowchart showing operations of the motor control device shown in FIG. 2.

DESCRIPTION OF THE PREFERRED EMBODIMENTS

Preferred embodiments of a motor control device, a control system, and a motor control method according to the present invention will be presented and described in detail below with reference to the accompanying drawings.

[Embodiments]

Figure 1:
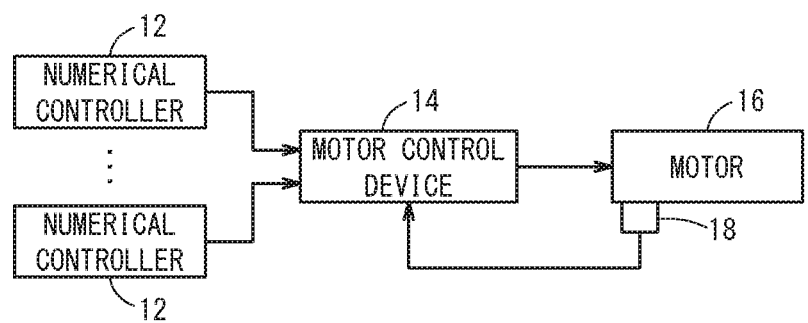
FIG. 1 is a diagram showing a schematic configuration of a control system according to an embodiment.

FIG. 1 is a diagram showing a schematic configuration of a control system 10 according to the present embodiment. The control system 10 comprises a plurality of numerical controllers 12, a motor control device 14, and a motor 16.

Control periods (first control periods) Tc of the plurality of numerical controllers 12, and control periods (second control periods) Tm of the motor control device 14 differ from each other. Further, it is assumed that the control periods Tc of the plurality of numerical controllers 12 differ from each other.

The numerical controllers 12 are higher order control devices for controlling the motor 16 in accordance with a program or an operator's operations for driving the motor 16. The numerical controllers 12 output (transmit) to the motor control device 14 commands (hereinafter referred to as movement commands) S for driving the motor 16. Stated otherwise, driving of the motor 16 is controlled by the plurality of numerical controllers 12.

The motor control device 14 controls the motor (for example, a servo motor) 16 in accordance with a plurality of movement commands (drive commands) S transmitted thereto from the plurality of numerical controllers 12. The motor control device 14 controls driving (rotation) of the motor 16 by supplying current to the motor 16 in accordance with the plurality of movement commands S.

A sensor 18 such as a rotation sensor (for example, an encoder) for detecting the rotational position or the rotational speed, and a current sensor for detecting the current supplied to the motor 16 is provided on the motor 16. The motor control device 14 feedback-controls the motor 16 on the basis of detection signals detected by the sensor 18.

Figure 2:
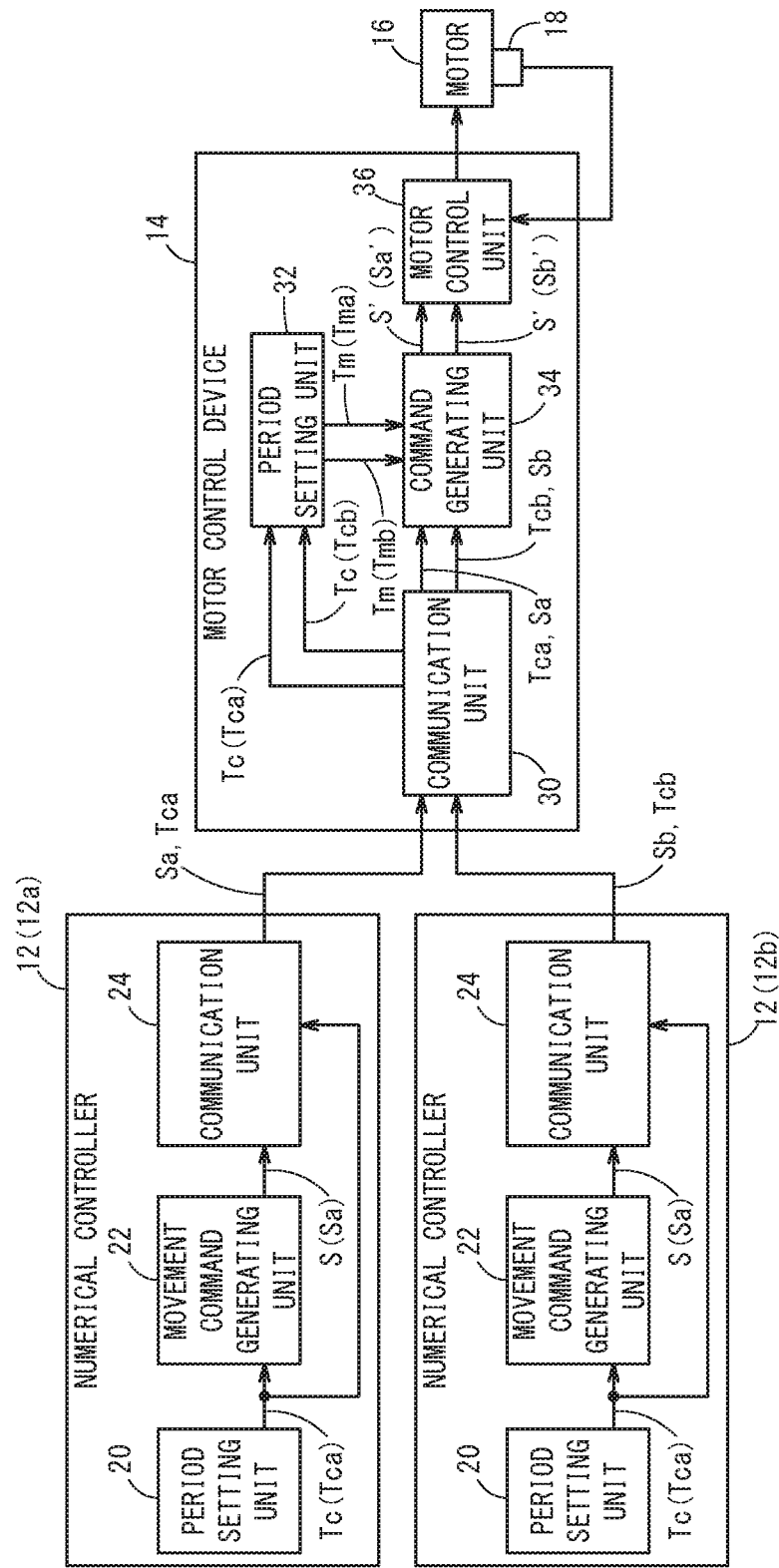
FIG. 2 is a functional block diagram showing a specific configuration of a plurality of numerical controllers and a motor control device of the control system shown in FIG. 1.

FIG. 2 is a functional block diagram showing a specific configuration of the plurality of numerical controllers 12 and the motor control device 14 of the control system 10. The numerical controllers 12 and the motor control device 14 are equipped with processors such as a CPU or the like, and memories, etc.

In the following explanation, in order to facilitate description, the number of numerical controllers 12 will be described as being two. Further, in order to distinguish mutually between the two numerical controllers 12, in certain cases, one of the numerical controllers 12 will be referred to with the reference numeral 12a, and the other of the numerical controllers 12 will be referred to with the reference numeral 12b. Further, in certain cases, the movement commands S from the numerical controller 12a will be referred to as Sa, the movement commands S from the numerical controller 12b will be referred to as Sb, the control periods Tc of the numerical controller 12a will be referred to as Tca, and the control periods Tc of the numerical controller 12b will be referred to as Tcb.

For example, the numerical controller 12a outputs movement commands Sa to the motor control device 14 for normally controlling the motor 16, and the numerical controller 12b outputs movement commands Sb to the motor control device 14 for controlling the motor 16 under certain special conditions. The control period Tca (the control period Tca of the numerical controller 12a) of the movement commands Sa is set to be longer than the control period Tcb (the control period Tcb of the numerical controller 12b) of the movement commands Sb (Tca>Tcb).

First, after describing the configuration of the motor control device 14, a description will be given concerning the configuration of the numerical controllers 12. Although the numerical controller 12a and the numerical controller 12b differ in terms of the their control periods Tc, since the configurations thereof are the same, in principle, the numerical controller 12a will be described as an example. The numerical controller 12a includes a period setting unit 20, a movement command generating unit 22, and a communication unit 24.

The period setting unit 20 sets a control period Tca in accordance with the processing load ratio by the numerical controller 12a (a load ratio of the CPU of the numerical controller 12a). For example, as the control period Tca becomes shorter, the load ratio of the CPU becomes higher, and therefore, the control period Tca is set to be longer in the case that the currently set load ratio is high, and the control period Tca is set to be shorter in the case that the currently set load ratio is low. In accordance with this feature, the stability of the control of the motor 16 can be prevented from deteriorating. In this instance, the load ratio of the CPU signifies a current effective amount of processing with respect to the processing capacity of the CPU. The period setting unit 20 outputs the set control period Tca to the movement command generating unit 22 and the communication unit 24.

The period setting unit 20 of the numerical controller 12a sets the control period Tca to be longer than the control period Tcb which is set by the period setting unit 20 of the numerical controller 12b.

By analyzing a program for driving the motor 16, the movement command generating unit 22 sequentially generates movement commands Sa at the set control period Tca. The movement command generating unit 22 outputs the generated movement commands Sa to the communication unit 24. Moreover, the movement command generating unit 22 of the numerical controller 12b sequentially generates movement commands Sb at the control period Tcb.

The communication unit 24 serves to send and receive signals with the motor control device 14. The communication unit (command transmitting unit) 24 transmits the set control period Tca to the motor control device 14. Further, the communication unit (command transmitting unit) 24 sequentially transmits the generated movement commands Sa to the motor control device 14 at the set control period Tca. Moreover, the communication unit 24 of the numerical controller 12b transmits the control period Tcb to the motor control device 14, and transmits the movement commands Sb to the motor control device 14 at the control period Tcb.

Next, a description will be made concerning the configuration of the motor control device 14. The motor control device 14 includes a communication unit 30, a period determination unit 32, a command generating unit 34, and a motor control unit 36.

The communication unit 30 serves to carry out sending and receiving of signals with the communication units 24 of the two numerical controllers 12 (12a, 12b). The communication unit (command receiving unit) 30 receives the movement commands S (Sa, Sb) and the control periods Tc (Tca, Tcb) of the movement commands S (Sa, Sb) from each of the two numerical controllers 12 (12a, 12b). The communication unit 30 outputs the two received control periods Tc (Tca, Tcb) to the period determination unit 32, together with outputting the received two control periods Tc (Tca, Tcb) and the two movement commands S (Sa, Sb) to the command generating unit 34.

Based on the two control periods Tc (Tca, Tcb), the period determination unit 32 determines two control periods Tm in accordance with each of the two control periods Tc (Tca, Tcb). Consequently, it is possible to determine two appropriate control periods Tm in accordance with each of the two control periods Tc (Tca, Tcb).

In this instance, in certain cases, the control periods Tm of the motor control device 14 determined in accordance with the control period Tca may be referred to by Tma, and the control periods Tm of the motor control device 14 determined in accordance with the control period Tcb may be referred to by Tmb. The period determination unit 32 determines, as the control periods Tm in accordance with the control periods Tc, periods which are shorter than the control periods Tc. Accordingly, the relationship between the control period Tca and the control period Tma is expressed by Tca>Tma, and the relationship between the control period Tcb and the control period Tmb is expressed by Tcb>Tmb. Moreover, the relationship Tca>Tcb may hold true, and the control period Tma may be longer than the control period Tcb.

The period determination unit 32 may determine two control periods Tm (Tma, Tmb) in accordance with each of the two control periods Tc (Tca, Tcb), from among the predetermined plurality of periods that differ from each other. Consequently, it is possible to cope with various control periods (Tc) or changes in the control periods (Tc).

Information indicative of the predetermined plurality of periods may be stored in the memory of the period determination unit 32. The period determination unit 32 outputs the two determined control periods Tm (Tma, Tmb) to the command generating unit 34.

On the basis of the two control periods Tc (Tca, Tcb) and the two control periods Tm (Tma, Tmb) in accordance with each of the two control periods Tc (Tca, Tcb), the command generating unit 34 generates movement commands S' (Sa', Sb') of the two control periods Tm (Tma, Tmb) from the movement commands S (Sa, Sb) of the two control periods Tc (Tca, Tcb).

According to the present embodiment, the control period Tca of the numerical controller 12a is described as being set to "8", the control period Tcb of the numerical controller 12b is described as being set to "3", the control period Tma corresponding to the control period Tca is described as being set to "6", and the control period Tmb corresponding to the control period Tcb is described as being set to "2". Moreover, although the units of the periods are not specified, the units of the control periods Tca, Tcb, Tma, and Tmb are the same.

More specifically, the command generating unit 34 generates the movement commands Sa' of the control period Tma from the movement commands Sa of the control period Tca, using a ratio (4:3) between the control period Tca and the control period Tma. Further, the command generating unit 34 generates the movement commands Sb' of the control period Tmb from the movement commands Sb of the control period Tcb, using a ratio (3:2) between the control period Tcb and the control period Tmb. Stated otherwise, on the basis of the control periods Tca and Tma, the command generating unit (command conversion unit) 34 converts the movement commands Sa of the control period Tca into the movement commands Sa' of the control period Tma. Further, on the basis of the control periods Tcb and Tmb, the command generating unit 34 converts the movement commands Sb of the control period Tcb into the movement commands Sb' of the control period Tmb.

Figure 3:
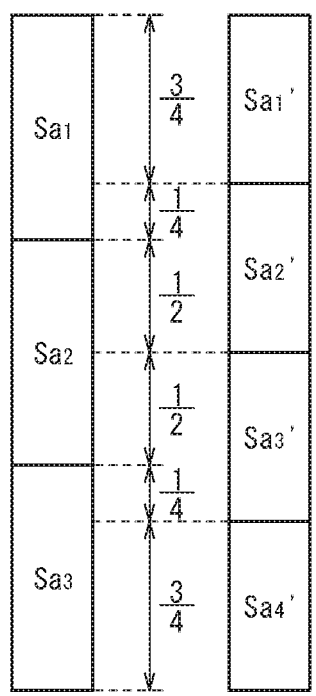
FIG. 3 is a diagram for explaining generation of movement commands by a command generating unit shown in FIG. 2.

FIG. 3 is a diagram for explaining generation of the movement commands S' by a command generating unit 34. In FIG. 3, a case will be presented and described as an example in which the movement commands Sa' are generated from the movement commands Sa.

The plurality of movement commands Sa received by the communication unit 30 are represented by $Sa_1$, $Sa_2$, and $Sa_3$, and the plurality of generated movement commands Sa' are represented by $Sa_1'$, $Sa_2'$, $Sa_3'$, and $Sa_4'$. The numerical controller 12a transmits the movement commands Sa in a manner so that the motor 16 is controlled in order of $Sa_1$, $Sa_2$, and $Sa_3$, and the communication unit 30 is made to receive the movement commands Sa in order of $Sa_1$, $Sa_2$, and $Sa_3$. Moreover, since the ratio between the control period Tca of the movement commands Sa and the control period Tma of the movement commands Sa' is 4:3, the periods of $Sa_1$ to $Sa_3$ and the periods of $Sa_1'$ to $Sa_4'$ become the same.

The command generating unit 34 generates as the movement command $Sa_1'$ a command corresponding to ¾ of the movement commands $Sa_1$. For example, in the case that the command $Sa_1$ is a command to rotate by 8 degrees, the generated movement command $Sa_1'$ becomes a command to rotate by 6 degrees (=8 degrees×¾).

In addition, the command generating unit 34 generates, as the movement command $Sa_2'$, a command including a command corresponding to the remaining one-fourth of the movement command $Sa_1$, and a command corresponding to one-half of the movement command $Sa_2$. For example, in the case that the movement command $Sa_2$ is a command to rotate by 4 degrees, the generated movement command $Sa_2'$ becomes a command including a command to rotate by 2 degrees (=8 degrees×¼) (a command corresponding to one-fourth of the movement command $Sa_1$), and a command to rotate by 2 degrees (=4 degrees×½) (a command corresponding to one-half of the movement command $Sa_2$).

In this manner, the command generating unit 34 generates the movement commands Sa' from the movement commands Sa, on the basis of the ratio (4:3) between the control period Tca and the control period Tma. Further, in a similar manner, the command generating unit 34 generates the movement commands Sb' from the movement commands Sb, on the basis of the ratio (3:2) between the control period Tcb and the control period Tmb. The command generating unit 34 outputs the generated movement commands S' (Sa', Sb') to the motor control unit 36. Since the control periods Tm are periods that are shorter than the corresponding control periods Tc, it is possible to prevent the stability of the control of the motor 16 from deteriorating.

According to the present invention, on the basis of the two control periods Tc (Tca, Tcb) and the two control periods Tm (Tma, Tmb) in accordance with each of the two control periods Tc (Tca, Tcb), the movement commands S' (Sa', Sb') of the two control periods Tm (Tma, Tmb) are generated from the movement commands S (Sa, Sb) of the two control periods Tc (Tca, Tcb). Consequently, the load on the motor control device 14 can be reduced.

For example, the control periods Tm of the motor control device 14 are set to one, and on the basis of the two control periods Tc (Tca, Tcb) and one control period Tm, the movement commands Sa', Sb' of the control period Tm are generated from the movement commands Sa of the control period Tca and the movement commands Sb of the control period Tcb. In this case as well, since it is preferable that the control periods Tm are shorter than the two control periods Tc (Tca, Tcb), the control periods Tm are set to "2", for example. However, the control period Tca is set to "8", and the control period Tcb is set to "3".

Therefore, the motor control device 14 is operated at the control period of "2", and it is necessary to generate the movement commands Sa', Sb' of the control period "2" from the movement command Sa whose control period Tca is "8" and the movement command Sb whose control period Tcb is "3". Therefore, the processing load by the motor control device 14 is increased.

In contrast thereto, according to the present embodiment, the two movement commands S' (Sa', Sb') are generated using the two control periods Tm (Tma, Tmb) in accordance with the two control periods Tc (Tca, Tcb). In accordance with this feature, in relation to the control period Tca having a long period, since the movement commands Sa' is generated with the comparatively long control period Tma, the processing load for generation of the movement commands Sa' can be reduced. As a result, the load on the motor control device 14 can be reduced.

The motor control unit 36 controls the motor 16 in accordance with the two movement commands S' (Sa', Sb'). The motor control unit 36 controls the motor 16 in accordance with a combined movement command Ss obtained by adding (superimposing) the two movement commands S' (Sa', Sb'). The motor control unit 36 controls the motor 16 at a period that is less than or equal to a control period Tmb having the shortest period from among the two control periods Tma and Tmb. In accordance with this feature, the stability of the control of the motor 16 can further be prevented from deteriorating. The motor control unit 36 feedback-controls the motor 16 on the basis of the detection signals detected by the sensor 18.

In this manner, even if the control periods Tc, Tm differ between the plurality of numerical controllers 12 and the motor control device 14, it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor 16 from deteriorating. Accordingly, even in the case that the control periods Tc, Tm differ mutually between the numerical controllers 12 and the motor control device 14, the motor 16 can be controlled in a manner so that the state of the motor 16 is substantially the same as when the motor control device 14 controls the motor 16 with the movement commands S in accordance with the control period Tc.

Further, on the basis of the two control periods Tc (Tca, Tcb) and the two control periods Tm (Tma, Tmb) in accordance with each of the two control periods Tc (Tca, Tcb), the two movement commands S' (Sa', Sb') are generated from the movement commands S (Sa, Sb) of the two control periods Tc (Tca, Tcb). In accordance with this feature, even in the case that the control periods Tc, Tm differ between the plurality of numerical controllers 12 and the motor control device 14, the load on the motor control device 14 can be reduced.

Figure 4:
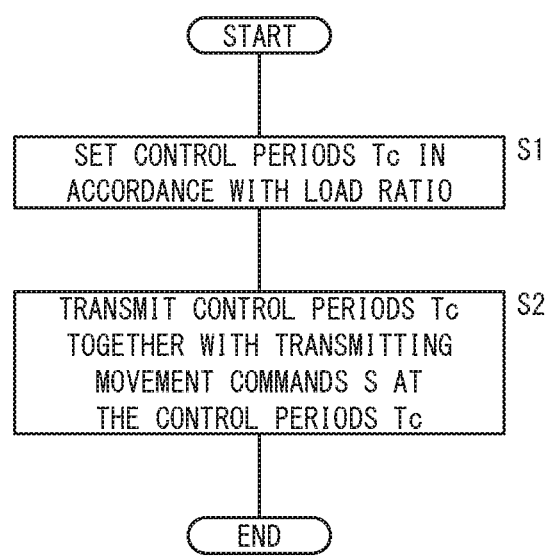
FIG. 4 is a flowchart showing operations of the numerical controllers shown in FIG. 2.

Next, operations of the numerical controllers 12 will be described with reference to the flowchart shown in FIG. 4. Such operations are executed respectively by each of the two numerical controllers 12. In step S1, the period setting units 20 set the control periods Tc in accordance with the processing load ratio by the numerical controllers 12. More specifically, the period setting unit 20 of the numerical controller 12a sets the control period Tca in accordance with the load ratio of the numerical controller 12a, and the period setting unit 20 of the numerical controller 12b sets the control period Tcb in accordance with the load ratio of the numerical controller 12b.

Next, in step S2, the communication units 24 transmit the control periods Tc that were set in step S1 to the motor control device 14, together with transmitting the movement commands S at the control periods Tc. More specifically, the communication unit 24 of the numerical controller 12a transmits the control period Tca that was set in step S1, together with transmitting the movement command Sa at the control period Tca to the motor control device 14. Further, the communication unit 24 of the numerical controller 12b transmits the control period Tcb that was set in step S1, together with transmitting the movement command Sb at the control period Tcb to the motor control device 14. Moreover, the movement commands S (Sa, Sb) are sequentially generated by the movement command generating unit 22 of the numerical controllers 12 (12a, 12b) at the control periods Tc (Tca, Tcb) that were set in step S1.

Next, operations of the motor control device 14 will be described with reference to the flowchart shown in FIG. 5. In step S11, the communication unit 30 receives the two control periods Tc (Tca, Tcb) and the movement commands S (Sa, Sb) that were transmitted from the two numerical controllers 12 (12a, 12b).

Next, in step S12, the period determination unit 32 determines the two control periods Tm (Tma, Tmb) in accordance with each of the two control periods Tc (Tca, Tcb) that were received in step S11. More specifically, the period determination unit 32 determines as the control period Tma in accordance with the control period Tca a period which is shorter than the control period Tca, and determines as the control period Tmb in accordance with the control period Tcb a period which is shorter than the control period Tcb.

Next, in step S13, on the basis of the two control periods Tc (Tca, Tcb) received in step S11 and the two control periods Tm (Tma, Tmb) determined in step S12, the command generating unit 34 generates the movement commands S' (Sa', Sb') of the two control periods Tm (Tma, Tmb) from the movement commands S (Sa, Sb) of the two control periods Tc (Tca, Tcb). More specifically, on the basis of the control period Tca and the control period Tma, the command generating unit 34 generates the movement commands Sa' of the control period Tma from the movement commands Sa of the control period Tca. Further, on the basis of the control period Tcb and the control period Tmb, the command generating unit 34 generates the movement commands Sb' of the control period Tmb from the movement commands Sb of the control period Tcb.

Next, in step S14, the motor control unit 36 controls the motor 16 in accordance with the two movement commands S' (Sa', Sb') that were generated in step S13. More specifically, the motor control unit 36 controls the motor 16 in accordance with the combined movement command Ss obtained by adding (superimposing) the two movement commands S' (Sa', Sb'). At this time, the motor control unit 36 controls the motor 16 at a period that is less than or equal to the control period Tmb having the shortest period from among the two control periods Tm (Tma, Tmb).

[Technical Concepts Obtained from the Embodiments]

Technical concepts which can be grasped from the above embodiments will be described below.

<First Technical Concept>

The motor control device (14) is equipped with the command receiving unit (30) which receives the movement commands (S) and the first control periods (Tc) of the movement commands (S) from each of the plurality of numerical controllers (12), the command generating unit (34) which, on the basis of the plurality of first control periods (Tc) and the plurality of second control periods (Tm) in accordance with each of the plurality of first control periods (Tc), generates the movement commands (S') of the plurality of second control periods (Tm) from the movement commands (S) of the plurality of first control periods (Tc), and the motor control unit (36) which controls the motor (16) in accordance with the plurality of movement commands (S') generated by the command generating unit (34).

Consequently, even if the control periods (Tc, Tm) differ between the plurality of numerical controllers (12) and the motor control device (14), it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor (16) from deteriorating. Further, the load on the motor control device (14) can be reduced.

The motor control device (14) may further comprise the period determination unit (32) which determines, on the basis of the plurality of first control periods (Tc), the plurality of second control periods (Tm) in accordance with each of the plurality of first control periods (Tc). In accordance with this feature, it is possible to determine a plurality of appropriate control periods (Tm) according to each of the plurality of first control periods (Tc). Accordingly, the load on the motor control device (14) can be reduced.

The period determination unit (32) may determine, as the second control periods (Tm) in accordance with the first control periods (Tc), periods which are shorter than the first control periods (Tc). In accordance with this feature, the stability of the control of the motor (16) can further be prevented from deteriorating.

The period determination unit (32) may determine the plurality of second control periods (Tm) in accordance with each of the plurality of first control periods (Tc), from among a predetermined plurality of periods that differ from each other. In accordance with this feature, it is possible to cope with various first control periods (Tc) or changes in the first control periods (Tc).

The motor control unit (36) may control the motor (16) according to the combined movement command (Ss) obtained by summing the plurality of movement commands (S') generated by the command generating unit (34). In accordance with this feature, the motor (16) can be appropriately controlled by the plurality of numerical controllers (12).

The motor control unit (36) may control the motor (16) at a period that is less than or equal to a shortest second control period (Tm) from among the plurality of second control periods (Tm). In accordance with this feature, the stability of the control of the motor (16) can further be prevented from deteriorating.

<Second Technical Concept>

The control system (10) comprises the motor control device (14) of the aforementioned first technical concept, and the plurality of numerical controllers (12). Each of the plurality of numerical controllers (12) comprises the period setting unit (20) which sets the first control periods (Tc), and the period setting unit (20) sets the first control periods (Tc) in accordance with the processing load ratio by the numerical controllers (12).

In accordance with this feature, the stability of the control of the motor (16) can be prevented from deteriorating, and the load on the motor control device (14) can be reduced.

<Third Technical Concept>

The motor control method for controlling the motor (16) comprises the command receiving step of the motor control device (14) receiving the movement commands (S) and the first control periods (Tc) of the movement commands (S) from each of the plurality of numerical controllers (12), the command generating step of the motor control device (14) generating, on the basis of the plurality of first control periods (Tc) and the plurality of second control periods (Tm) in accordance with each of the plurality of first control periods (Tc), the movement commands (S') of the plurality of second control periods (Tm) from the movement commands of the plurality of first control periods (Tc), and the motor controlling step of the motor control device (14) controlling the motor (16), in accordance with the plurality of movement commands (S') generated by the command generating step.

Consequently, even if the control periods (Tc, Tm) differ between the plurality of numerical controllers (12) and the motor control device (14), it is possible to prevent an excess or deficiency from occurring in the number of data required for the control, and to prevent the control from being delayed. Therefore, it is possible to prevent fluctuations in speed and positional deviations from occurring, as well as to prevent the stability of the control of the motor (16) from deteriorating. Further, the load on the motor control device (14) can be reduced.

In the motor control method, the motor control device (14) may include the period determining step of determining, on the basis of the plurality of first control periods (Tc), the plurality of second control periods (Tm) in accordance with each of the plurality of first control periods (Tc). In accordance with this feature, it is possible to determine a plurality of appropriate control periods (Tm) according to each of the plurality of first control periods (Tc). Accordingly, the load on the motor control device (14) can be reduced.

The period determining step may determine, as the second control periods (Tm) in accordance with the first control periods (Tc), periods which are shorter than the first control periods (Tc). In accordance with this feature, the stability of the control of the motor (16) can further be prevented from deteriorating.

In the period determining step, the plurality of second control periods (Tm) may be determined in accordance with each of the plurality of first control periods (Tc), from among a predetermined plurality of periods that differ from each other. In accordance with this feature, it is possible to cope with various first control periods (Tc) or changes in the first control periods (Tc).

The motor controlling step may control the motor (16) according to the combined movement command (Ss) obtained by summing the plurality of movement commands (S') generated by the command generating step. In accordance with this feature, the motor (16) can be appropriately controlled by the plurality of numerical controllers (12).

The motor controlling step may control the motor (16) at a period that is less than or equal to a shortest second control period (Tm) from among the plurality of second control periods (Tm). In accordance with this feature, the stability of the control of the motor (16) can further be prevented from deteriorating.

In the motor control method, the plurality of numerical controllers (12) may include a period setting step of setting the plurality of first control periods (Tc) in accordance with a processing load ratio by the numerical controllers (12). In accordance with this feature, the stability of the control of the motor (16) can be prevented from deteriorating.

The present invention is not limited to the above-described embodiment, and various modifications can be made without departing from the gist of the present invention.

What is claimed is:

1. A motor control device comprising:
    a command receiving unit adapted to receive movement commands and first control periods of the movement commands from each of a plurality of numerical controllers;
    a command generating unit which, on the basis of the plurality of different first control periods and a plurality of different second control periods in accordance with each of the plurality of different first control periods, is adapted to generate movement commands of the plurality of different second control periods from the movement commands of the plurality of different first control periods; and
    a motor control unit adapted to control a motor, in accordance with the plurality of movement commands generated by the command generating unit.

2. The motor control device according to claim 1, further comprising a period determination unit adapted to determine, on the basis of the plurality of different first control periods, the plurality of different second control periods in accordance with each of the plurality of different first control periods.

3. The motor control device according to claim 2, wherein the period determination unit determines, as the second control periods in accordance with the first control periods, periods which are shorter than the first control periods.

4. The motor control device according to claim 2, wherein the period determination unit determines the plurality of different second control periods in accordance with each of the plurality of different first control periods, from among a predetermined plurality of periods that differ from each other.

5. The motor control device according to claim 1, wherein the motor control unit controls the motor according to a combined movement command obtained by summing the plurality of movement commands generated by the command generating unit.

6. The motor control device according to claim 5, wherein the motor control unit controls the motor at a period that is less than or equal to a shortest second control period from among the plurality of different second control periods.

7. A control system comprising the motor control device and the plurality of numerical controllers according to claim 1, wherein each of the plurality of numerical controllers comprises a period setting unit adapted to set the first control periods, and the period setting units set the first control periods in accordance with a processing load ratio by the numerical controllers.

8. A motor control method for controlling a motor, comprising:
 a command receiving step of a motor control device receiving movement commands and first control periods of the movement commands from each of a plurality of numerical controllers;
 a command generating step of the motor control device generating, on the basis of the plurality of different first control periods and a plurality of different second control periods in accordance with each of the plurality of different first control periods, movement commands of the plurality of different second control periods from the movement commands of the plurality of different first control periods; and
 a motor controlling step of the motor control device controlling the motor, in accordance with the plurality of movement commands generated by the command generating step.

9. The motor control method according to claim 8, wherein the motor control device includes a period determining step of determining, on the basis of the plurality of different first control periods, the plurality of different second control periods in accordance with each of the plurality of different first control periods.

10. The motor control method according to claim 9, wherein the period determining step determines, as the second control periods in accordance with the first control periods, periods which are shorter than the first control periods.

11. The motor control method according to claim 9, wherein the period determining step determines the plurality of different second control periods in accordance with each of the plurality of different first control periods, from among a predetermined plurality of periods that differ from each other.

12. The motor control method according to claim 8, wherein the motor controlling step controls the motor according to a combined movement command obtained by summing the plurality of movement commands generated by the command generating unit.

13. The motor control method according to claim 12, wherein the motor controlling step controls the motor at a period that is less than or equal to a shortest second control period from among the plurality of different second control periods.

14. The motor control method according to claim 8, wherein the plurality of numerical controllers include a period setting step of setting the plurality of different first control periods in accordance with a processing load ratio by the numerical controllers.

* * * * *